(12) United States Patent
Inuzuka et al.

(10) Patent No.: US 10,859,258 B2
(45) Date of Patent: Dec. 8, 2020

(54) SPRAY NOZZLE AND DEAERATOR

(71) Applicant: MITSUBISHI HITACHI POWER SYSTEMS, LTD., Kanagawa (JP)

(72) Inventors: Taisuke Inuzuka, Tokyo (JP); Jiro Kasahara, Tokyo (JP); Issaku Fujita, Kanagawa (JP); Taichi Nakamura, Kanagawa (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 667 days.

(21) Appl. No.: 15/552,969

(22) PCT Filed: Jan. 22, 2016

(86) PCT No.: PCT/JP2016/051928
§ 371 (c)(1),
(2) Date: Aug. 23, 2017

(87) PCT Pub. No.: WO2016/136347
PCT Pub. Date: Sep. 1, 2016

(65) Prior Publication Data
US 2018/0245789 A1 Aug. 30, 2018

(30) Foreign Application Priority Data
Feb. 26, 2015 (JP) ................................. 2015-037312

(51) Int. Cl.
F22D 1/28 (2006.01)
B01D 19/00 (2006.01)
(Continued)

(52) U.S. Cl.
CPC ............. *F22D 1/28* (2013.01); *B01D 19/001* (2013.01); *F22D 1/50* (2013.01); *F22B 37/02* (2013.01)

(58) Field of Classification Search
None
See application file for complete search history.

(56) References Cited

U.S. PATENT DOCUMENTS

2006/0060087 A1   3/2006  Grobelny et al.

FOREIGN PATENT DOCUMENTS

| CN | 2255299 | 6/1997 |
|---|---|---|
| CN | 1670430 | 9/2005 |

(Continued)

OTHER PUBLICATIONS

Translation of JPH11351507A, accessed Apr. 9, 2020 (Year: 1999).*

(Continued)

*Primary Examiner* — Christopher P Jones
*Assistant Examiner* — Phillip Y Shao
(74) *Attorney, Agent, or Firm* — Wenderoth, Lind & Ponack, L.L.P.

(57) ABSTRACT

A spray nozzle and a deaerator each include an external cylinder provided with a plurality of jetting outlets on an outer circumference portion thereof, an inner cylinder that is supported inside the external cylinder so as to be movable in an axial center direction and is provided with a plurality of first communication holes capable of communicating with the jetting outlets, and an open-close valve that includes a shaft coupled to the inner cylinder and a valve body provided at a distal end portion of the shaft and capable of opening and closing a distal opening of the external cylinder. The spray nozzle and the deaerator thus structured provide improved performance by preventing an increase in pressure loss occurring regardless of a jet flow amount.

8 Claims, 9 Drawing Sheets

(51) Int. Cl.
*F22D 1/50* (2006.01)
*F22B 37/02* (2006.01)

(56) References Cited

FOREIGN PATENT DOCUMENTS

| | | |
|---|---|---|
| CN | 203695259 | 7/2014 |
| DE | 102 40 324 | 3/2004 |
| JP | 63-217109 | 9/1988 |
| JP | 8-85023 | 4/1996 |
| JP | 09-280510 | 10/1997 |
| JP | 11-153301 | 6/1999 |
| JP | 11-351507 | 12/1999 |
| JP | 2004-116915 | 4/2004 |
| KR | 20-1999-0039839 | 11/1999 |

OTHER PUBLICATIONS

Translation of DE10240324A1, accessed Apr. 9, 2020 (Year: 2004).*
Office Action dated Aug. 24, 2018 in corresponding Chinese Application No. 201680011609.6, with English translation.
Notification of Reason for Refusal dated Aug. 27, 2018 in corresponding Korean Application No. 10-2017-7023381, with English translation.
Office Action dated Nov. 22, 2019 in corresponding Indian Patent Application No. 201747029613.

* cited by examiner

SPRAY NOZZLE AND DEAERATOR

FIELD

The present invention relates to a spray nozzle used for a deaerator removing an impurity such as dissolved oxygen from feedwater, and a deaerator using the spray nozzle.

BACKGROUND

In an example of nuclear power generation plants, steam generated by a nuclear reactor is sent to a turbine generator to generate power, the used steam is cooled by a condenser, and the cooled steam is returned to the nuclear reactor as steam condensate. Steam after being used for driving the turbine is cooled by cooling water in the condenser so as to be returned as steam condensate (low pressure saturated liquid). Thereafter, the steam condensate is supplied to a deaerator by a steam condensate pump through a low pressure feedwater heater. The deaerator removes impurities such as dissolved oxygen and non-condensable gases in the steam condensate. Thereafter, the steam condensate is supplied, by a main feed pump, to a high pressure feedwater heater for heating the steam condensate, for example. Thereafter, the heated steam condensate is returned to a steam generator.

An example of conventional deaerators is a bubbling type deaerator. The bubbling type deaerator includes spray nozzles at its upper portion, jets steam condensate downward from the spray nozzles, and jets heated steam into a water storage to generate a large number of bubbles. As a result of contact between the steam condensate and the heated steam, oxygen in the steam condensate is transferred to the heated steam. Deaeration is, thus, performed. Such deaerators are described in the following Patent Literatures 1 and 2, for example.

CITATION LIST

Patent Literature

Patent Literature 1: Japanese Laid-open Patent Publication No. H11-351507 A
Patent Literature 2: Japanese Laid-open Patent Publication No. 2004-116915 A

SUMMARY

Technical Problem

For example, when a nuclear power generation plant needs to generate a large amount of power, it is necessary to increase an amount of steam generated by the steam generator and to increase power of the steam turbine to drive the power generator. This requirement causes an increase in amount of steam (steam condensate) processed by the condenser, thereby increasing the size of the deaerator. As described above, the deaerator jets steam condensate from the spray nozzles provided at its upper portion, causes the steam condensate and heated steam to be in contact with each other, thereby removing oxygen dissolved in the steam condensate as a result of transfer of oxygen from the steam condensate to the heated steam. The conventional spray nozzles, thus, have a problem in that pressure loss in a large flow amount region increases when the size of the deaerator increases.

The invention solves the problem described above, and aims to provide a spray nozzle and a deaerator that reduce an increase in pressure loss occurring regardless of a jet flow amount to enhance performance thereof.

Solution to Problem

To achieve an object described above, a spray nozzle according to the present invention that jets steam condensate in a deaerator vessel includes an external cylinder that is provided with a plurality of jetting outlets on an outer circumference portion of the external cylinder, an inner cylinder that is supported inside the external cylinder so as to be movable in an axial center direction, and is provided with a plurality of first communication holes capable of communicating with the jetting outlets, and an open-close valve, a shaft of the open-close valve being coupled to the inner cylinder, a valve body of the open-close valve being provided at a distal end portion of the shaft and being capable of opening and closing a distal opening of the external cylinder.

When the open-close valve moves forward and the valve body opens the distal opening of the external cylinder, steam condensate is jetted from the distal end portion of the external cylinder, and at that time, if the jetting outlets and the first communication holes communicate with each other, steam condensate is jetted from the side of the external cylinder. This makes it possible to increase a jet flow amount and to enhance the performance of the spray nozzle by preventing an increase in pressure loss occurring regardless of the jet flow amount.

In the spray nozzle according to the present invention, a partition plate provided with a plurality of second communication holes is connected to a distal end portion of the inner cylinder, and the shaft is disposed along the axial center direction of the inner cylinder, penetrates the partition plate, and is connected to the partition plate.

The inner cylinder and the open-close valve that are coupled with the partition plate make it possible to easily synchronize the movements of the open-close valve and the inner cylinder, thereby making it possible to supply a certain amount of steam condensate to the distal opening of the external cylinder through the second communication holes.

In the spray nozzle according to the present invention, the jetting outlets and the first communication holes do not communicate with each other when the valve body is at a first open position where the valve body opens the distal opening of the external cylinder, and the jetting outlets and the first communication holes communicate with each other when the valve body is at a second open position where the valve body opens the distal opening of the external cylinder.

A small jet flow amount state where steam condensate is jetted from only the distal opening of the external cylinder, and a large jet flow amount state where steam condensate is jetted from both of the distal opening of the external cylinder and the multiple jetting outlets can be switched, thereby making it possible to easily adjust a jetting amount of steam condensate.

In the spray nozzle according to the present invention, the first communication holes are long holes along the axial center direction of the inner cylinder.

The first communication holes, thus, can easily communicate with the jetting outlets.

In the spray nozzle according to the present invention, the jetting outlets are provided in the axial center direction of the external cylinder with a certain distance between the jetting outlets.

This makes it possible to switch the jet flow amount state to a medium jet flow amount state where steam condensate is jetted from the distal opening of the external cylinder and a part of the multiple jetting outlets, thereby making it possible to adjust a jetting amount of steam condensate in a step-by-step manner.

In the spray nozzle according to the present invention, the jetting outlets have a taper shape in which an opening area of the jetting outlets increases outwards.

This structure, thus, makes it possible to jet steam condensate from the jetting outlets in a wide range, and also to reduce resistance in the jetting.

In the spray nozzle according to the present invention, the external cylinder has an attachment flange provided on an outer circumference portion of the external cylinder.

This allows the external cylinder to be attached to the deaerator vessel with the attachment flange interposed therebetween, thereby making it possible to improve attachment workability, and also allows the external cylinder to be easily removed from the vessel, thereby making it possible to improve maintainability.

In the spray nozzle according to the present invention, a deaerator includes a vessel having a hollow shape and an outlet provided at a lower portion of the vessel, the spray nozzle described above, the spray nozzle being provided at an upper portion of the vessel, and a heated steam jetting-distributing device that jets heated steam to the lower portion of the vessel.

When the spray nozzle jets steam condensate in the vessel and the heated steam jetting-distributing device jets heated steam to the steam condensate, the steam condensate and the heated steam are in contact with each other. As a result, oxygen in the steam condensate is transferred to the heated steam. Deaeration is, thus, performed. The spray nozzle jets steam condensate from the distal end portion and the side thereof, thereby making it possible to increase a jet flow amount and to enhance the performance thereof by preventing an increase in pressure loss occurring regardless of the jet flow amount.

Advantageous Effects of Invention

According to the spray nozzle and the deaerator of the invention, the spray nozzle jets steam condensate from the distal end portion and the side thereof, thereby making it possible to increase a jet flow amount and to enhance the performance thereof by preventing an increase in pressure loss occurring regardless of the jet flow amount.

DESCRIPTION OF EMBODIMENTS

The following describes preferred embodiments of a spray nozzle and a deaerator according to the invention in detail with reference to the accompanying drawings. The embodiments do not limit the invention. The structures obtained by combining the multiple embodiments are also included in the invention.

First Embodiment

For example, in a nuclear power generation plant including a pressurized water reactor (PWR), the nuclear reactor heats primary cooling water to generate high temperature high pressure steam and supplies the heated steam to a steam generator. The steam generator heats secondary cooling water by the steam (primary cooling water) to generate steam. The generated steam drives a steam turbine to cause a power generator to generate power. A condenser cools the steam having driven the steam turbine by cooling water (sea water) to return the steam to steam condensate (low pressure saturated liquid). Thereafter, the steam condensate is supplied, by a steam condensate pump, to a deaerator through a low pressure feedwater heater. The deaerator removes impurities such as dissolved oxygen and non-condensable gases in the steam condensate. Thereafter, the steam condensate is supplied, by a main feed pump, to a high pressure feedwater heater for heating the steam condensate, for example. The heated steam condensate is, then, returned to the steam generator.

Figure 1:
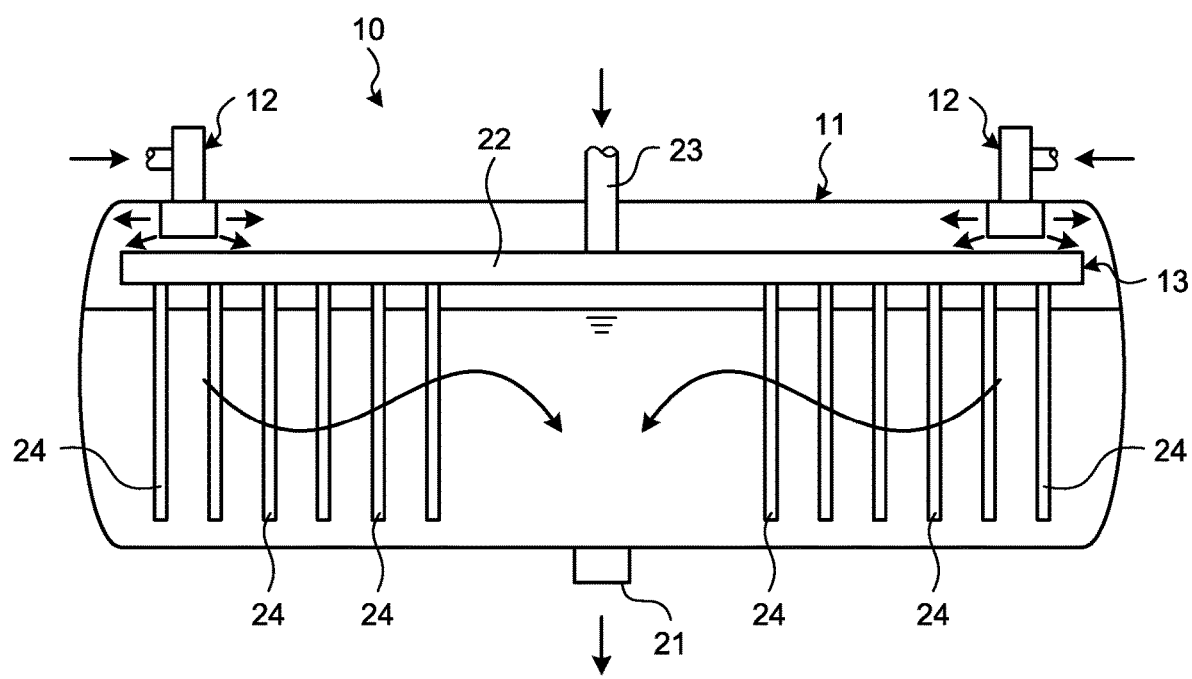
FIG. 1 is a schematic diagram illustrating a deaerator using a spray nozzle in a first embodiment.

FIG. 1 is a schematic diagram illustrating a deaerator that uses spray nozzles in a first embodiment.

In the first embodiment, as illustrated in FIG. 1, a deaerator 10 includes a vessel (deaerator vessel) 11, spray nozzles 12, and a heated steam supply device 13.

The vessel 11 has a hollow shape and both ends of a laterally long cylindrical portion in a longitudinal direction thereof are closed by curved cover portions. The vessel 11 is provided with a plurality of spray nozzles 12 (in the embodiment, two spray nozzles) at an upper portion thereof. The spray nozzles 12 jet, inside the vessel 11, steam condensate that has been generated in the condenser by cooling steam and heated by the low pressure feedwater heater. The spray nozzles 12 are arranged at the upper portion of the vessel 11 and on both end sides of the vessel 11 in the longitudinal direction, and jet steam condensate to the upper side in the vessel 11. The vessel 11 is provided with an outlet 21 that discharges the steam condensate.

The vessel 11 is provided with a heated steam jetting-distributing device 13 that jets heated steam downward inside the vessel 11. The heated steam jetting-distributing device 13 includes a heated steam distributing pipe 22, a heated steam supply pipe 23, and heated steam jetting pipes 24. The heated steam distributing pipe 22 is disposed at an upper portion inside the vessel 11 along the longitudinal direction of the vessel 11. The heated steam supply pipe 23 penetrates the upper portion of the vessel 11 from outside the vessel 11, and is connected to an intermediate portion in the longitudinal direction of the heated steam distributing pipe 22. The heated steam jetting pipes 24 extend downward from both end sides of the heated steam distributing pipe 22 in the longitudinal direction. The multiple heated steam jetting pipes 24 are arranged in the longitudinal direction of the heated steam distributing pipe 22 with a certain distance therebetween. The heated steam jetting pipes 24 each have a base end portion (upper end portion) that is connected to the heated steam distributing pipe 22 and a distal end portion (lower end portion) that extends toward the bottom of the vessel 11, and a plurality of jetting outlets are formed (not illustrated).

When the respective spray nozzles 12 jet steam condensate in the vessel 11, a certain amount of steam condensate is stored in the vessel 11. The heated steam jetting-distributing device 13 supplies heated steam to the multiple heated steam jetting pipes 24 through the heated steam supply pipe 23 from the heated steam distributing pipe 22. The respective heated steam jetting pipes 24, thus, jet the heated steam into the steam condensate from the multiple jetting outlets formed at lower end portions thereof. The steam condensate stored in the vessel 11 and the heated steam jetted from the jetting outlets are in contact with each other. Oxygen dissolved in the steam condensate is, thus, transferred to the heated steam. As a result, oxygen dissolved in the steam condensate is removed.

Figure 2:
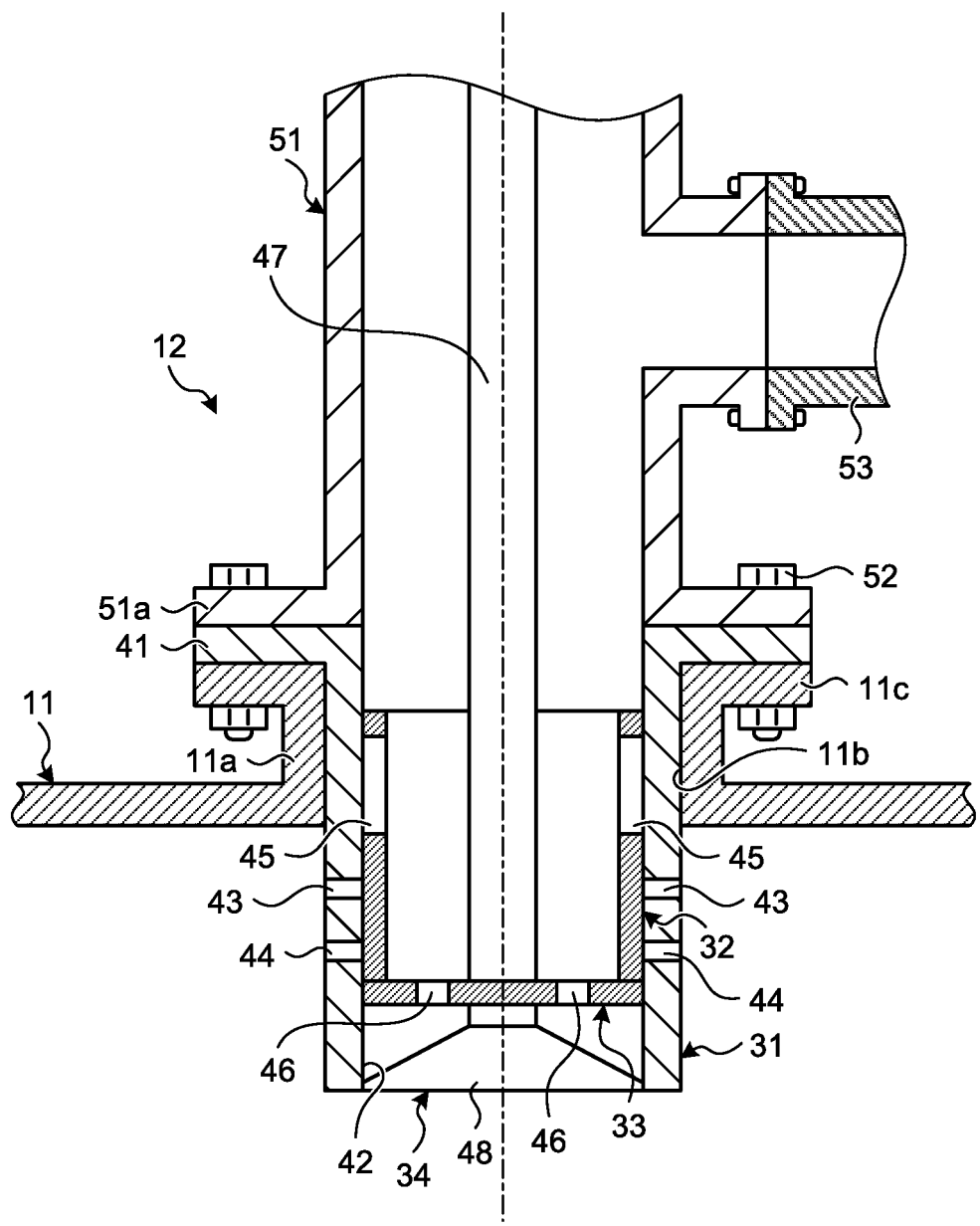
FIG. 2 is a cross-sectional view of the spray nozzle in the first embodiment.
Figure 3:
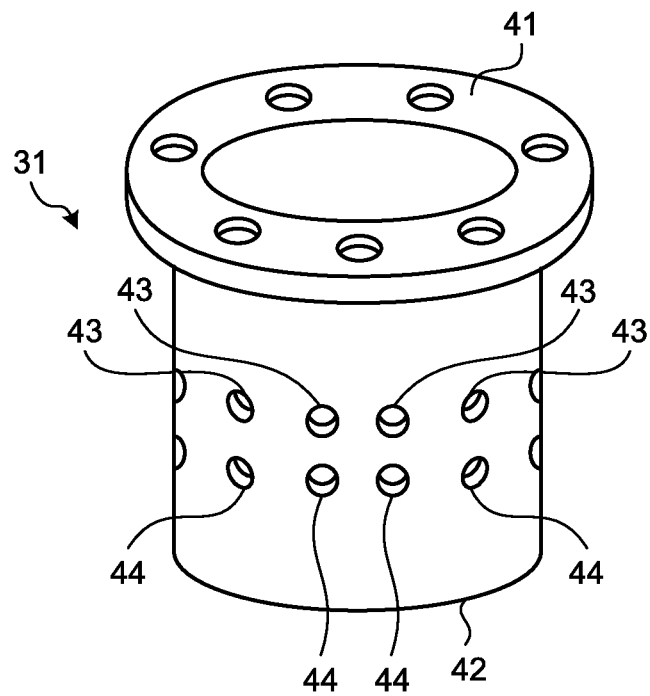
FIG. 3 is a perspective view illustrating an external cylinder.
Figure 4:
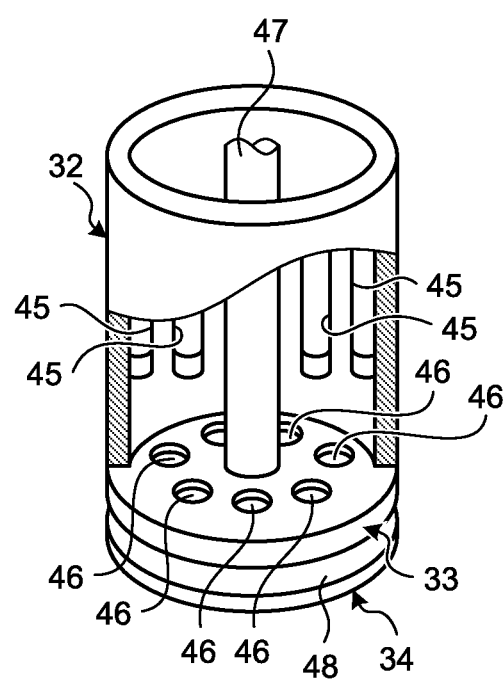
FIG. 4 is a perspective view illustrating an inner cylinder.
Figure 5:
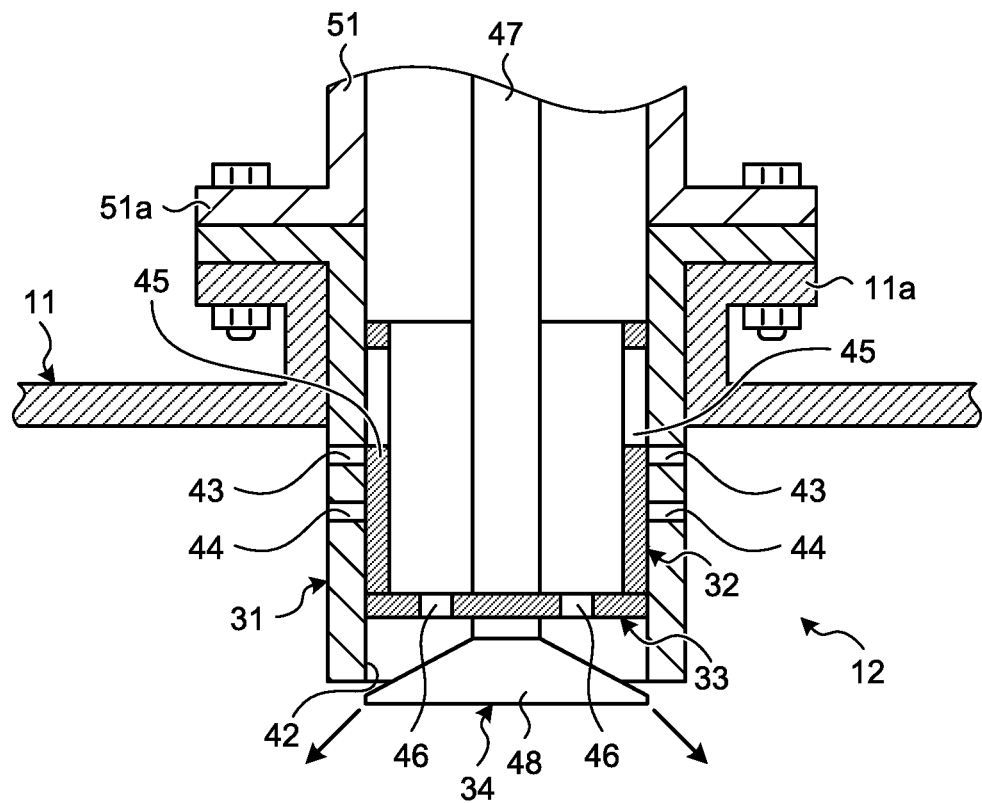
FIG. 5 is a cross-sectional view of the spray nozzle when a small amount of steam condensate is jetted.
Figure 6:
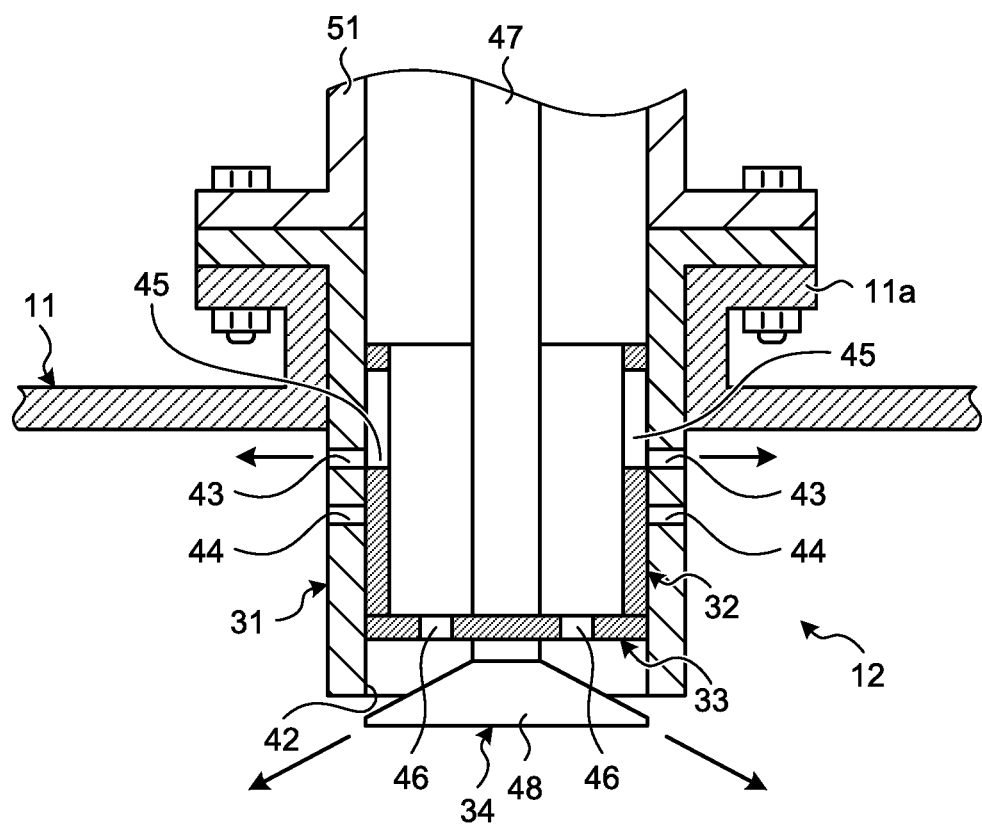
FIG. 6 is a cross-sectional view of the spray nozzle when a medium amount of steam condensate is jetted.
Figure 7:
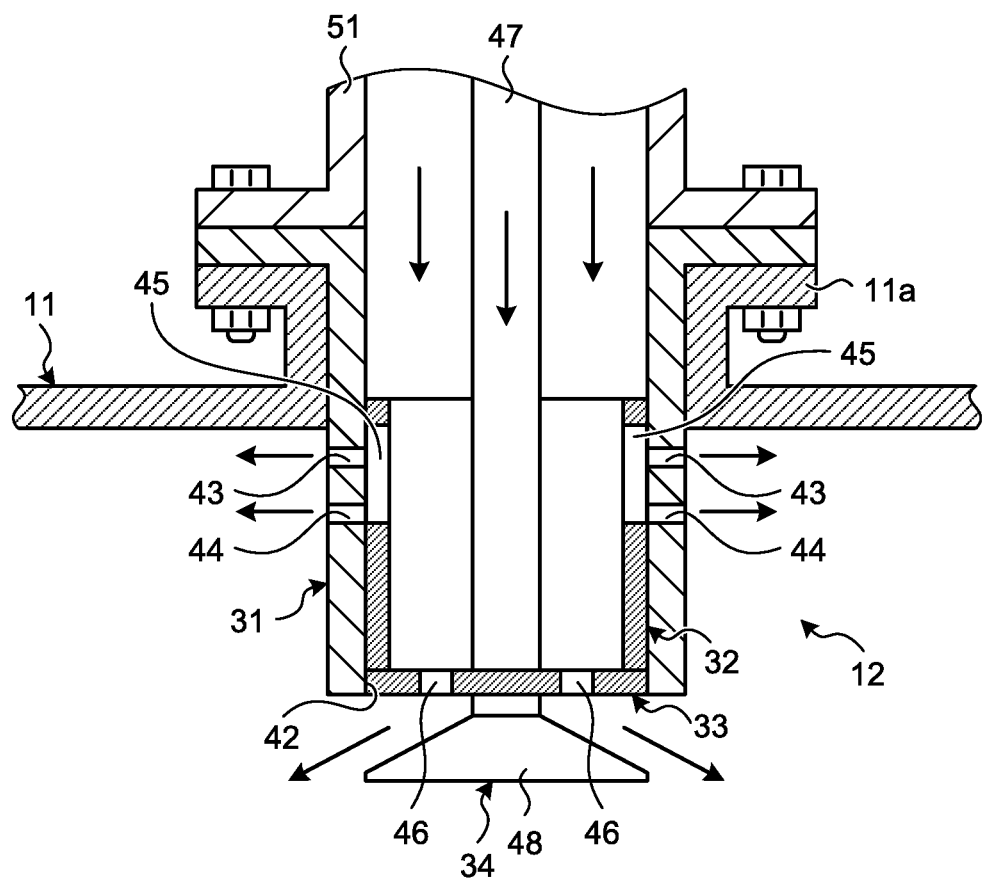
FIG. 7 is a cross-sectional view of the spray nozzle when a large amount of steam condensate is jetted.

The following describes the spray nozzle in the first embodiment in detail. FIG. 2 is a cross-sectional view of the spray nozzle in the first embodiment. FIG. 3 is a perspective view illustrating an external cylinder. FIG. 4 is a perspective view illustrating an inner cylinder. FIG. 5 is a cross-sectional view of the spray nozzle when a small amount of steam condensate is jetted. FIG. 6 is a cross-sectional view of the spray nozzle when a medium amount of steam condensate is jetted. FIG. 7 is a cross-sectional view of the spray nozzle when a large amount of steam condensate is jetted.

As illustrated in FIG. 2, the vessel 11 has an attachment opening 11b formed by a nozzle 11a, and an attachment flange 11c. The spray nozzle 12 includes an external cylinder 31, an inner cylinder 32, a partition plate 33, and an open-close valve 34. The spray nozzle 12 is fitted to the attachment opening 11b formed by the nozzle 11a of the vessel 11 and attached thereto with the attachment flange 11c.

As illustrated in FIGS. 2 to 4, the external cylinder 31 has a cylindrical shape. The external cylinder 31 has an attachment flange 41 that has a ring shape, extends to an outer diameter side thereof, and is formed integrally with the external cylinder 31 at the base end portion (upper end portion) thereof, and a distal opening 42 formed at the distal end portion (lower end portion) thereof. The external cylinder 31 is provided with a plurality of jetting outlets 43 and 44 on an outer circumference portion thereof. The multiple jetting outlets 43 are formed in a circumferential direction on a base end portion side of the external cylinder 31 with a certain distance (equal distance) therebetween. The multiple jetting outlets 44 are formed in the circumferential direction on a distal end portion side of the external cylinder 31 with a certain distance (equal distance) therebetween. The jetting outlets 43 and 44 are formed in such a manner that they are apart from each other in the axial center direction of the external cylinder 31 with a certain distance therebetween. In this case, the jetting outlets 43 and 44 are arranged in a grid pattern in which they face with each other in the axial center direction. The jetting outlets 43 and 44 may be arranged in a zigzag pattern in which they are located at different positions from each other in the circumferential direction.

The inner cylinder 32 has a cylindrical shape in the same manner as the external cylinder 31. The base end portion (upper end portion) and the distal end portion (lower end portion) of the inner cylinder 32 are open. The inner cylinder 32 has an outer diameter set to have a dimension slightly smaller than the inner diameter of the external cylinder 31. The inner cylinder 32 is supported inside the external cylinder 31 so as to be movable in the axial center direction. The inner cylinder 32 is provided with a plurality of first communication holes 45 that can communicate with the multiple jetting outlets 43 and 44. The multiple first communication holes 45, each of which is a long hole along the axial center direction of the inner cylinder 32, are formed in a circumferential direction with a certain distance (equal distance) therebetween. The number and the locations in the circumferential direction of the first communication holes 45 coincide with those of the jetting outlets 43 and 44. The width of the first communication hole 45 is substantially equal to the inner diameter of each of the jetting outlets 43 and 44 while the length of the first communication hole 45 is substantially equal to a distance between the jetting outlets 43 and 44 in the axial center direction.

The partition plate 33 has a disc shape. The outer diameter of the partition plate 33 is set to have the same dimension as the outer diameter of the inner cylinder 32. The outer periphery portion of the partition plate 33 is fixed to the lower end portion of the inner cylinder 32. The partition plate 33 is provided with a plurality of second communication holes 46 along a circumferential direction.

The open-close valve 34 includes a shaft 47 and a valve body 48. The shaft is disposed at the center position of the external cylinder 31, the inner cylinder 32, and the partition plate 33 along the axial center direction. The distal end portion (lower end portion) of the shaft penetrates the partition plate 33, and the shaft is connected to the partition plate 33. The distal end portion of the shaft 47 penetrates the partition plate 33 and is connected to the valve body 48. The valve body 48 has a disc shape. The outer diameter of the valve body 48 is set to have a dimension substantially the same as the inner diameter of the external cylinder 31. The valve body 48 is fitted to the distal opening 42 and is capable of opening and closing the distal opening 42 by being moved in the axial direction. The open-close valve 34 is provided with a driving device (not illustrated) at the base end portion (upper end portion) of the shaft 47, which can move the valve body 48 via the shaft 47.

When the valve body 48 of the open-close valve 34 is at a close position where the valve body 48 is fitted to the distal opening 42 of the external cylinder 31, the multiple jetting outlets 43 and 44 of the external cylinder 31 and the multiple first communication holes 45 of the inner cylinder 32 do not communicate with each other. As illustrated in FIG. 5, when the valve body 48 of the open-close valve 34 moves forward (downward) by a certain distance from the close state, and is at a first open position where the valve body 48 opens the distal opening 42 of the external cylinder 31 by a small amount, the multiple jetting outlets 43 and 44 of the external cylinder 31 and the multiple first communication holes 45 of the inner cylinder 32 do not communicate with each other. As illustrated in FIG. 6, when the valve body 48 of the open-close valve 34 moves forward by a certain distance from the first open state, and is at a second open position where the valve body 48 opens the distal opening 42 of the external cylinder 31 by a medium amount, the multiple jetting outlets 43 of the external cylinder 31 and the multiple first communication holes 45 of the inner cylinder 32 communicate with each other, whereas the multiple jetting outlets 44 and the multiple first communication holes 45 do not communicate with each other. As illustrated in FIG. 7, when the valve body 48 of the open-close valve 34 moves forward by a certain distance from the second open state, and is at a third open position where the valve body 48 opens the distal opening 42 of the external cylinder 31 by a large amount, the multiple jetting outlets 43 and 44 of the external cylinder 31 and the multiple first communication holes 45 of the inner cylinder 32 communicate with each other.

The outer circumference portion of the external cylinder 31 of the spray nozzle 12 is fitted to the attachment opening 11b formed by the nozzle 11a of the vessel 11, and the attachment flange 41 is in close contact with the attachment flange 11c. An attachment flange 51a of a connection pipe 51 is in close contact with the attachment flange 41. The vessel 11, the external cylinder 31, and the connection pipe 51 are joined by fastening bolts 52. To the connection pipe 51, a steam condensate supply pipe 53 is connected. In this case, steam condensate is supplied to the spray nozzles 12 from the steam condensate supply pipe 53 through the connection pipe 51 with a certain pressure.

The following describes the operation of the spray nozzle 12 in the first embodiment.

As illustrated in FIG. 2, when the spray nozzle 12 stops, the open-close valve 34 does not operate, the valve body 48 closes the distal opening 42 of the external cylinder 31, and the inner cylinder 32 closes the multiple jetting outlets 43 and 44 of the external cylinder 31. As illustrated in FIG. 5, when the spray nozzle 12 jets a small amount of steam condensate, the open-close valve 34 operates to cause the valve body 48 to move forward by a certain distance via the shaft 47. The valve body 48, thus, opens the distal opening 42 of the external cylinder 31 by a small amount, whereas the inner cylinder 32 still closes the multiple jetting outlets 43 and 44 of the external cylinder 31. As a result, steam condensate supplied in the inner cylinder 32 with a certain pressure passes through the second communication holes 46, and is jetted from the distal opening 42 of the external cylinder 31 by a small amount.

As illustrated in FIG. 6, when the spray nozzle 12 jets a medium amount of steam condensate, the open-close valve 34 operates to cause the valve body 48 to further move forward by a certain distance via the shaft 47. The valve body 48, thus, opens the distal opening 42 of the external cylinder 31 by a medium amount and the multiple first communication holes 45 of the inner cylinder 32 communicate with the multiple jetting outlets 43 of the external cylinder 31, whereas the multiple jetting outlets 44 are still closed. As a result, steam condensate supplied in the inner cylinder 32 with a certain pressure passes through the second communication holes 46, and is jetted from the distal opening 42 of the external cylinder 31 by a medium amount, and is jetted from the multiple jetting outlets 43.

As illustrated in FIG. 7, when the spray nozzle 12 jets a large amount of steam condensate, the open-close valve 34 operates to cause the valve body 48 to further move forward by a certain distance via the shaft 47. The valve body 48, thus, opens the distal opening 42 of the external cylinder 31 by a large amount, and the multiple first communication holes 45 of the inner cylinder 32 communicate with the multiple jetting outlets 43 and 44 of the external cylinder 31. As a result, steam condensate supplied in the inner cylinder 32 with a certain pressure passes through the second communication holes 46 and is jetted from the distal opening 42 of the external cylinder 31 by a large amount, and is jetted from the multiple jetting outlets 43 and 44.

Figure 8:
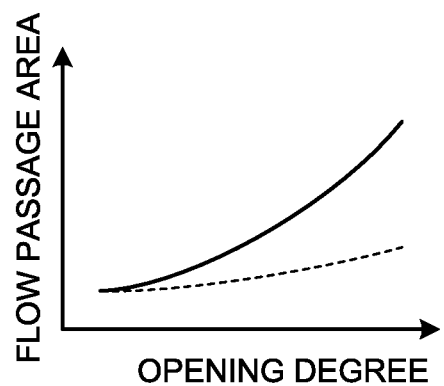
FIG. 8 is a graph illustrating a flow passage area with respect to an opening degree of the spray nozzle.
Figure 9:
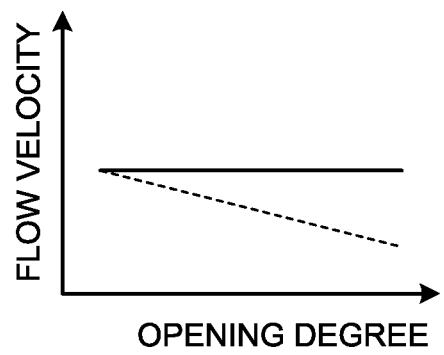
FIG. 9 is a graph illustrating a flow velocity with respect to the opening degree of the spray nozzle.
Figure 10:
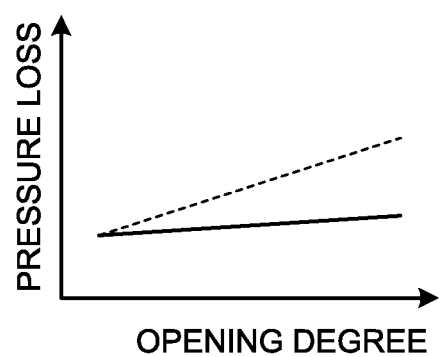
FIG. 10 is a graph illustrating a pressure loss with respect to the opening degree of the spray nozzle.

FIG. 8 is a graph illustrating a flow passage area with respect to an opening degree of the spray nozzle. FIG. 9 is a graph illustrating a flow velocity with respect to the opening degree of the spray nozzle. FIG. 10 is a graph illustrating a pressure loss with respect to the opening degree of the spray nozzle.

In FIG. 8, as the opening degree of the spray nozzle increases, the flow passage area of a conventional spray nozzle linearly increases as illustrated with the dot line in FIG. 8, whereas the flow passage area of the spray nozzle 12 in the first embodiment largely increases nonlinearly as illustrated with the solid line in FIG. 8. In FIG. 9, as the opening degree of the spray nozzle increases, the flow velocity of the conventional spray nozzle decreases as illustrated with the dot line in FIG. 9, whereas the flow velocity of the spray nozzle 12 in the first embodiment is almost constant as illustrated with the solid line in FIG. 9. In FIG. 10, as the opening degree of the spray nozzle increases, the pressure loss in the conventional spray nozzle largely increases as illustrated with the dot line in FIG. 10 while the pressure loss in the spray nozzle 12 in the first embodiment is almost unchanged as illustrated with the solid line in FIG. 10.

The spray nozzle in the first embodiment includes the external cylinder 31 provided with the multiple jetting outlets 43 and 44 on the outer circumference portion, the inner cylinder 32 that is supported inside the external cylinder 31 so as to be movable in the axial center direction and is provided with the multiple first communication holes 45 capable of communicating with the multiple jetting outlets 43 and 44, and the open-close valve 34 that includes the shaft 47 coupled to the inner cylinder 32 and the valve body 48 provided at the distal end portion of the shaft 47 and capable of opening and closing the distal opening 42 of the external cylinder 31.

When the valve body 48 of the open-close valve 34 moves forward to open the distal opening 42 of the external cylinder 31, steam condensate is jetted from the distal end portion of the external cylinder 31, and if the jetting outlets 43 and 44 and the first communication holes 45 communicate with each other at that time, steam condensate is jetted from the side of the external cylinder 31. This makes it possible to increase a jet flow amount and to enhance the performance of the spray nozzle by preventing an increase in pressure loss occurring regardless of the jet flow amount.

In the spray nozzle in the first embodiment, the partition plate 33 provided with the multiple second communication holes 46 is connected to the distal end portion of the inner cylinder 32, the shaft 47 is disposed along the axial center direction of the inner cylinder 32, and the shaft 47 penetrates the partition plate 33 and is connected to the partition plate 33. The inner cylinder 32 and the open-close valve 34 that are coupled with the partition plate 33 make it possible to easily synchronize the movements of the open-close valve 34 and the inner cylinder 32, thereby making it possible to supply a certain amount of steam condensate to the distal opening 42 of the external cylinder through the second communication holes 46.

In the spray nozzle in the first embodiment, when the valve body 48 is at the first open position where the valve body 48 opens the distal opening 42 of the external cylinder 31, the multiple jetting outlets 43 and 44 and the multiple first communication holes 45 do not communicate with each other, and when the valve body 48 is at the second and the third open positions where the valve body 48 opens the distal opening 42 of the external cylinder 31, the multiple jetting outlets 43 and 44 and the multiple first communication holes 45 communicate with each other. A small jet flow amount state where steam condensate is jetted from only the distal opening 42 of the external cylinder 31, a medium jet flow amount state or a large jet flow amount state where steam condensate is jetted from both of the distal opening 42 of the external cylinder 31 and the multiple jetting outlets 43 and 44, thus, can be switched, thereby making it possible to easily adjust a jetting amount of steam condensate.

The spray nozzle in the first embodiment is provided with the first communication holes 45 each of which is a long hole along the axial center direction of the inner cylinder 32. The first communication holes 45, thus, can easily communicate with the jetting outlets 43 and 44.

The spray nozzle in the first embodiment is provided with the multiple jetting outlets 43 and 44 in the axial center direction of the external cylinder 31 with a certain distance therebetween. This makes it possible to switch the jet flow amount state to the medium jet flow amount state where steam condensate is jetted from the distal opening 42 of the external cylinder 31 and a part of the multiple jetting outlets 43 and 44, thereby making it possible to adjust a jetting amount of steam condensate in a step-by-step manner.

The spray nozzle in the first embodiment has the attachment flange 41 on the outer circumference portion of the external cylinder 31. This allows the external cylinder 31 to be attached to the vessel 11 with the attachment flange 41 interposed therebetween, thereby making it possible to improve attachment workability, and also allows the external cylinder 31 to be easily removed from the vessel 11, thereby making it possible to improve maintainability.

The deaerator in the first embodiment includes the vessel 11 having a hollow shape and the outlet 21 provided at the lower portion thereof, the spray nozzles 12 provided at the upper portion of the vessel 11, and the heated steam jetting-distributing device 13 jetting heated steam to the lower portion of the vessel 11. When the spray nozzles 12 jet steam condensate in the vessel 11 and the heated steam jetting-distributing device 13 jets heated steam to the steam condensate, the steam condensate and the heated steam are in contact with each other. As a result, oxygen in the steam condensate is transferred to the heated steam. Deaeration is, thus, performed. The spray nozzles 12 each jet steam condensate from the distal end portion and the side thereof, thereby making it possible to increase a jet flow amount and to enhance the performance thereof by preventing an increase in pressure loss occurring regardless of the jet flow amount.

Second Embodiment

Figure 11:
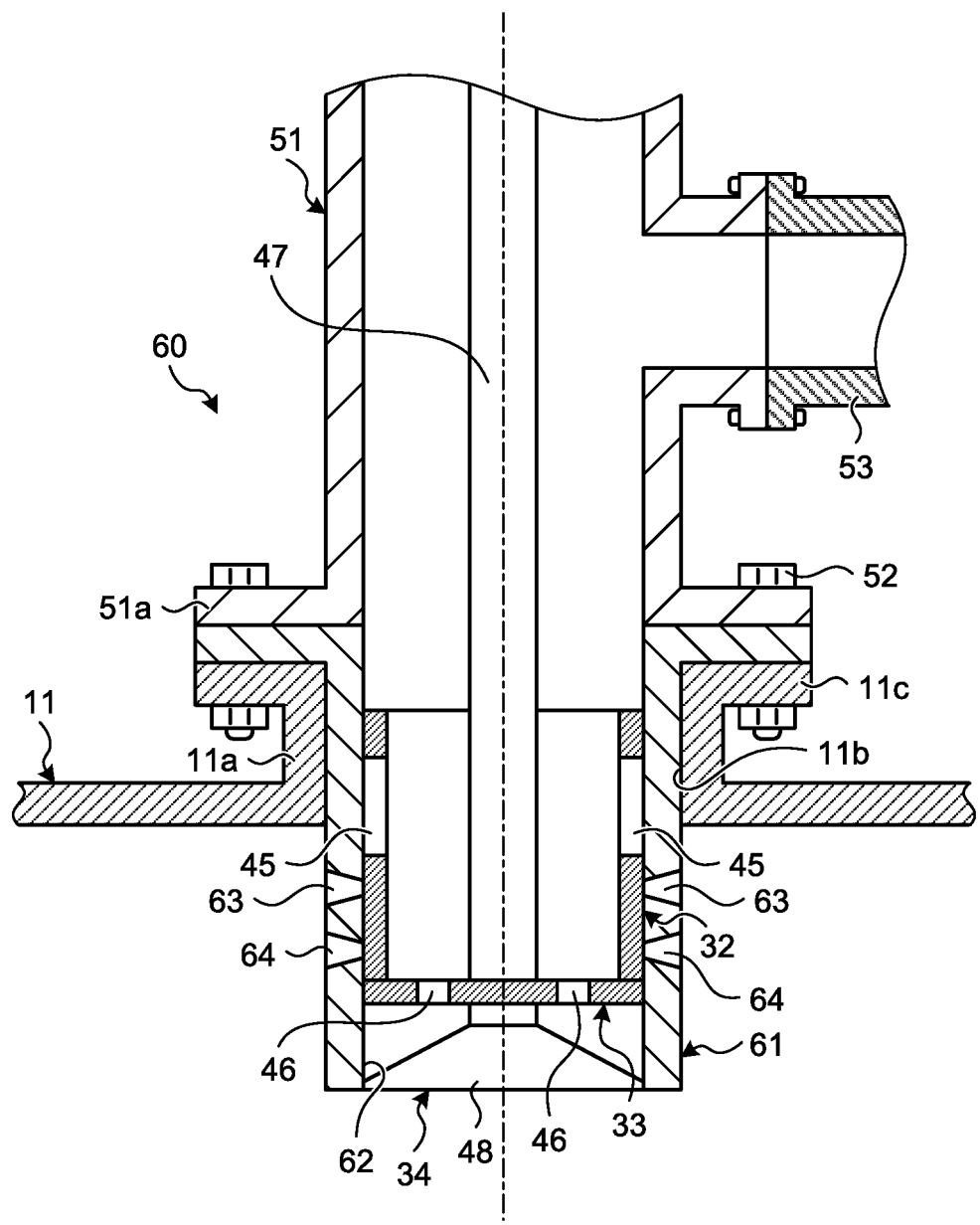
FIG. 11 is a cross-sectional view of a spray nozzle in a second embodiment.

FIG. 11 is a cross-sectional view of a spray nozzle in a second embodiment. In the following description, the members having the same functions as the embodiment described above are denoted by the same reference numerals, and the detailed descriptions thereof are omitted.

As illustrated in FIG. 11, a spray nozzle 60 in the second embodiment includes an external cylinder 61, the inner cylinder 32, the partition plate 33, and the open-close valve 34.

The external cylinder 61 has a cylindrical shape and a distal opening 62 formed at its distal end portion (lower end portion). The external cylinder 61 is provided with a plurality of jetting outlets 63 and 64 on an outer circumference portion thereof. The multiple jetting outlets 63 are formed in a circumferential direction on a base end portion side of the external cylinder 61 with a certain distance (equal distance) therebetween. The multiple jetting outlets 64 are formed in the circumferential direction on a distal end portion side of the external cylinder 61 with a certain distance (equal distance) therebetween. The jetting outlets 63 and 64 are formed in the axial center direction of the external cylinder 61 with a certain distance therebetween. The multiple jetting outlets 63 and 64 each have a taper shape in which an opening area thereof increases outwards.

The inner cylinder 32, the partition plate 33, and the open-close valve 34 are the same as those in the first embodiment, and descriptions thereof are, thus, omitted.

When the spray nozzle 12 jets steam condensate, the open-close valve 34 operates to cause the valve body 48 to move forward by a certain distance via the shaft 47. The valve body 48, thus, opens the distal opening 62 of the external cylinder 61, and the multiple first communication holes 45 of the inner cylinder 32 communicate with the multiple jetting outlets 63 and 64 of the external cylinder 61. As a result, steam condensate supplied in the inner cylinder 32 with a certain pressure passes through the second communication holes 46 and is jetted from the distal opening 62 of the external cylinder 61, and is jetted from the multiple jetting outlets 63 and 64. The multiple jetting outlets 63 and 64 each having a taper shape in which an opening area thereof increases outwards, thus, cause steam condensate to be jetted in a wide range.

The spray nozzle in the second embodiment includes the external cylinder 61 provided with multiple jetting outlets 63 and 64 each having a taper shape in which an opening area thereof increases outwards. This structure, thus, makes it possible to jet steam condensate from the jetting outlets 63 and 64 in a wide range, and also to reduce resistance in the jetting.

In the embodiments described above, the inner cylinder 32 and the shaft 47 of the open-close valve 34 are coupled with the partition plate 33. The structure is, however, not limited to this example. For example, the inner cylinder 32 and the open-close valve 34 may be coupled with a plurality of connection rods.

In the embodiments described above, the spray nozzles 12 are provided on both end portions of the vessel 11 in the longitudinal direction. The locations and the number of the spray nozzles 12 are not limited to any specific locations and number.

REFERENCE SIGNS LIST 10 deaerator
11 vessel (deaerator vessel)
12, 60 spray nozzle
13 heated steam supply device
21 outlet
22 heated steam distributing pipe
23 heated steam supply pipe
24 heated steam jetting pipe
31, 61 external cylinder
32 inner cylinder
33 partition plate
34 open-close valve
41 attachment flange
42, 62 distal opening
43, 44, 63, 64 jetting outlet
45 first communication hole
46 second communication hole
47 shaft
48 valve body
51 connection pipe 52 fastening bolt
53 steam condensate supply pipe

The invention claimed is:

1. A spray nozzle that jets steam condensate in a deaerator vessel, the spray nozzle comprising:
an external cylinder that is provided with a plurality of jetting outlets on an outer circumference portion of the external cylinder;
an inner cylinder that is supported inside the external cylinder so as to be movable in an axial center direction, and is provided with a plurality of first communication holes capable of communicating with the jetting outlets; and
an open-close valve, a shaft of the open-close valve being fixedly coupled to the inner cylinder, a valve body of the open-close valve being provided at a distal end portion of the shaft and being capable of opening and closing a distal opening of the external cylinder.

2. The spray nozzle according to claim 1, wherein a partition plate provided with a plurality of second communication holes is connected to a distal end portion of the inner cylinder, and the shaft is disposed along the axial center direction of the inner cylinder, penetrates the partition plate, and is connected to the partition plate.

3. The spray nozzle according to claim 1, wherein the jetting outlets and the first communication holes do not communicate with each other when the valve body is at a first open position where the valve body opens the distal opening of the external cylinder, and the jetting outlets and the first communication holes communicate with each other when the valve body is at a second open position where the valve body opens the distal opening of the external cylinder.

4. The spray nozzle according to claim 1, wherein the first communication holes are long holes along the axial center direction of the inner cylinder.

5. The spray nozzle according to claim 4, wherein the jetting outlets are provided in the axial center direction of the external cylinder with a predetermined distance between the jetting outlets.

6. The spray nozzle according to claim 1, wherein the jetting outlets have a taper shape in which an opening area of the jetting outlets increases outwards.

7. The spray nozzle according to claim 1, wherein the external cylinder has an attachment flange provided on an outer circumference portion of the external cylinder.

8. A deaerator, comprising:
a vessel having a hollow shape and an outlet provided at a lower portion of the vessel;
the spray nozzle according to claim 1, the spray nozzle being provided at an upper portion of the vessel; and
a heated steam jetting distributor that jets heated steam to the lower portion of the vessel.

* * * * *